United States Patent
Hu

(10) Patent No.: US 8,472,668 B2
(45) Date of Patent: Jun. 25, 2013

(54) IMAGE ANALYZING APPARATUS, IMAGE ANALYZING METHOD, AND COMPUTER READABLE MEDIUM

(75) Inventor: Yi Hu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 432 days.

(21) Appl. No.: 12/838,238

(22) Filed: Jul. 16, 2010

(65) Prior Publication Data

US 2011/0026810 A1     Feb. 3, 2011

(30) Foreign Application Priority Data

Jul. 30, 2009   (JP) .................................. 2009-178442

(51) Int. Cl.
  *G06K 9/00* (2006.01)
(52) U.S. Cl.
  USPC ........................................................... 382/103
(58) Field of Classification Search
  USPC ......................................... 382/103, 181–231
  See application file for complete search history.

(56) References Cited

U.S. PATENT DOCUMENTS

| | | | | |
|---|---|---|---|---|
| 6,618,490 | B1 * | 9/2003 | Cham et al. ................... | 382/103 |
| 2009/0083228 | A1 * | 3/2009 | Shatz et al. ....................... | 707/3 |

OTHER PUBLICATIONS

Japanese Office Action dated Nov. 27, 2012 issued in Japanese Patent Application No. 2009-178442 (English translation is attached).
Takayoshi Yamashita et al.; Human Tracking by OnlineReal Boosting; Computer Vision and Image Media, IPSJ Journal; Information Processing Society of Japan. Nov. 15, 2008. Vol. No. 1; pp. 73-82 (English translation is attached).

* cited by examiner

*Primary Examiner* — Alex Liew
(74) *Attorney, Agent, or Firm* — Birch, Stewart, Kolasch & Birch, LLP

(57) ABSTRACT

Provided is an image analyzing apparatus for efficiently performing detection of an object and tracking of a specified object, including a feature value recording section that records a plurality of reference feature values different in type from each other; a feature value extracting section that extracts a plurality of feature values different in type from each other, from each of a plurality of moving image constituent images included in a moving image; an object extracting section that extracts an object from the moving image constituent images, based on a degree of matching of the plurality of extracted feature values with respect to the plurality of reference feature values recorded in the feature value recording section; a reference feature value calculating section that calculates, from the plurality of reference feature values recorded in the feature value recording section, a plurality of reference feature values adjusted to the feature values of the extracted object, to a predetermined degree corresponding to the type; and a feature value updating section that updates the plurality of reference feature values recorded in the feature value recording section, with the plurality of reference feature values calculated by the reference feature value calculating section.

17 Claims, 6 Drawing Sheets

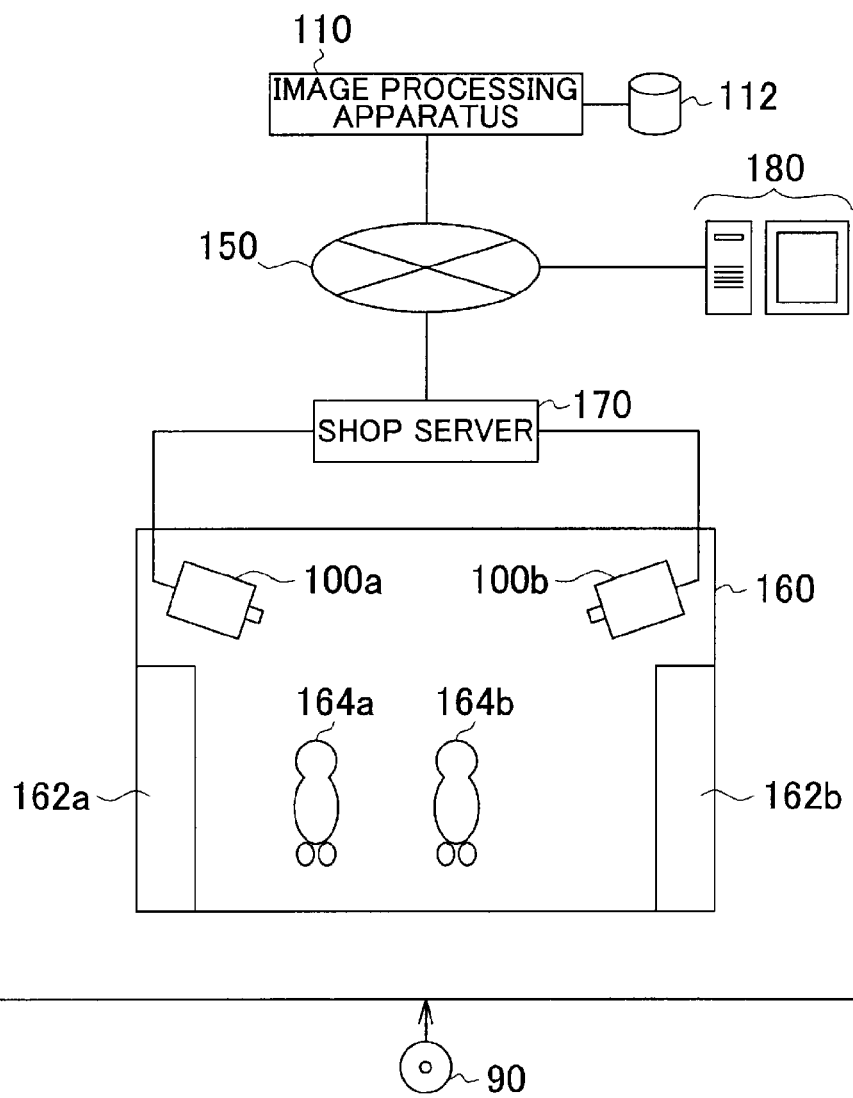
F I G. 1

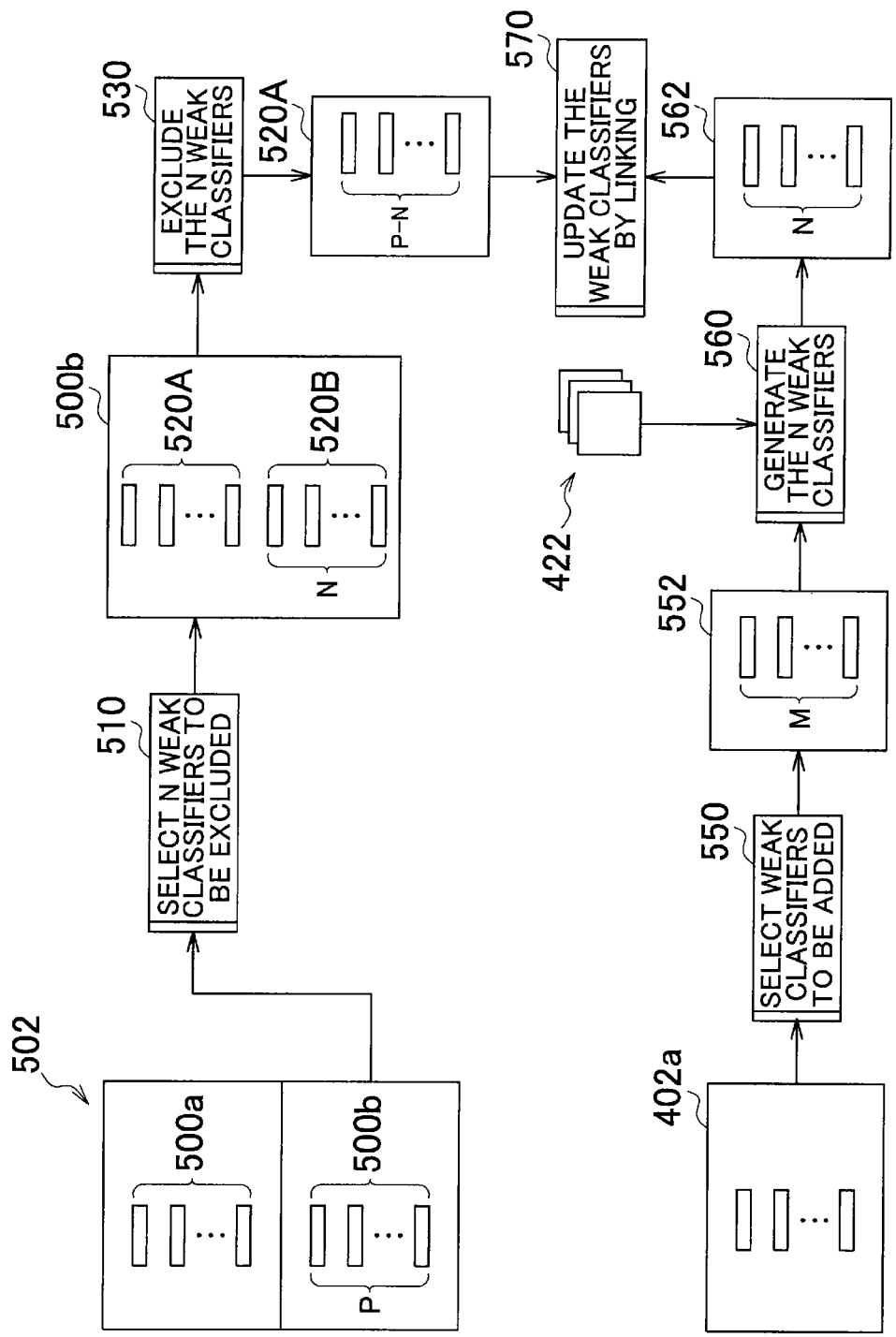
F I G. 4

IMAGE ANALYZING APPARATUS, IMAGE ANALYZING METHOD, AND COMPUTER READABLE MEDIUM

BACKGROUND

1. Technical Field

The present invention relates to an image analyzing apparatus, an image analyzing method, and a computer readable medium. The contents of the following patent application is incorporated herein by reference, No. 2009-178442 filed on Jul. 30, 2009.

2. Description of the Related Art

Conventionally, an apparatus able to determine the type of feature value and the classification condition used for identifying whether target data such as image data is data of a specific content is known (see Patent Document No. 1, for example). In addition, a technology of recognizing a subject in a moving image with high definition is conventionally known (see Patent Document No. 2, for example).

Patent Document No. 1: Japanese Patent Application Publication No. 2005-115525

Patent Document No. 2: Japanese Patent Application Publication No. 2001-34756

Non-Patent Document No. 1: Jacky S. C. Yuk, Kwan-Yee K. Wong, Ronald H. Y. Chung, F. Y. L. Chin and K. P. Chow, "Real-time multiple head shape detection and tracking system with decentralized trackers," Proceedings of the Sixth International Conference on Intelligent Systems Design and Application (ISDA'06), vol. 02, pp. 384-389, 2006

Non-Patent Document No. 2: Shai Aviaden, Ensemble Tracking, IEEE Transactions on Pattern Analysis and Machine Intelligence, vol. 29, issue. 2, pp. 261-271, February, 2007

Non-Patent Document No. 3: Helmut Grabner, Michael Grabner, "Real-time tracking via on-line boosting," vol. 1, pp. 47-57, BMVC2006

SUMMARY

However, if reference data defining the type of feature value and the classification condition is used, it is not easy to identify a subject whose feature value changes. In addition, when the feature value has greatly changed, it may be detected as a different subject, to inhibit tracking of the specific object. In this way, the detection of an object and tracking of the specific object were not able to be performed efficiently.

So as to solve the stated problems, according to a first aspect of the innovations herein, provided is an image analyzing apparatus for extracting a specific object from a moving image, including: a feature value recording section that records a plurality of reference feature values different in type from each other; a feature value extracting section that extracts a plurality of feature values different in type from each other, from each of a plurality of moving image constituent images included in a moving image; an object extracting section that extracts an object from the moving image constituent images, based on a degree of matching of the plurality of extracted feature values with respect to the plurality of reference feature values recorded in the feature value recording section; a reference feature value calculating section that calculates, from the plurality of reference feature values recorded in the feature value recording section, a plurality of reference feature values adjusted to the feature values of the extracted object, to a predetermined degree corresponding to the type; and a feature value updating section that updates the plurality of reference feature values recorded in the feature value recording section, with the plurality of reference feature values calculated by the reference feature value calculating section.

The reference feature value calculating section may calculate the plurality of reference feature values adjusted to the feature values of the extracted object, such that a reference feature value of a type having a greater degree of matching is adjusted to a greater degree.

The reference feature value calculating section may calculate a plurality of reference feature values adjusted to the feature values of the extracted object, with frequencies corresponding to the type.

An arrangement is also possible in which the feature value extracting section extracts a plurality of feature values from images having different resolutions from each other; the feature value recording section records therein a plurality of reference feature values corresponding to the plurality of feature values extracted from the images having different resolutions from each other; and the reference feature value calculating section calculates a plurality of reference feature values adjusted to the feature values of the extracted object to a degree corresponding to the resolution.

The reference feature value calculating section may calculate the plurality of reference feature values, such that a reference feature value having a larger resolution is adjusted to a greater degree.

The reference feature value calculating section may calculate the plurality of reference feature values that are adjusted to the feature values of the extracted object and correspond to a resolution larger than a predetermined value.

The reference feature value calculating section may include a non-update feature value selecting section that sets one or more types of reference feature values matching a predetermined condition, which have been used by the object extracting section to extract an object from the moving image constituent images, as part of the adjusted reference feature values.

The non-update feature value selecting section may set, as part of the adjusted reference feature values, one or more types of reference feature values having a degree of matching equal to or greater than a predetermined value, which have been used by the object extracting section to extract an object from the moving image constituent images.

The reference feature value calculating section may further include: an updated feature value selecting section that preferentially selects a type having a greater degree of matching, from among types other than the types of reference feature values selected by the non-update feature value selecting section; and an updated feature value calculating section that calculates one or more reference feature values adjusted to the feature values of the extracted object, for the type selected by the updated feature value selecting section.

The updated feature value calculating section may select one or more of the adjusted reference feature values, as part of the adjusted reference feature values, by giving higher priority to a reference feature value having a higher degree of matching with respect to a feature value of the extracted object.

An arrangement is also possible in which the object extracting section extracts an object using at least P predetermined types of reference feature values that can be updated, the updated feature value calculating section selects N types of reference feature values as part of the adjusted reference feature values, by giving higher priority to a reference feature value having a higher degree of matching with respect to a feature value of the extracted object, and the non-update feature value selecting section sets, as part of the adjusted reference feature values, (P−N) types of reference feature values having a degree of matching equal to or larger than a predetermined value, which have been used by the object extracting section to extract an object from the moving image constituent images.

An arrangement is also possible in which the updated feature value selecting section selects M types of reference feature values by giving higher priority to a reference feature value having a higher degree of matching with respect to a feature value of the extracted object, M being larger than N, and the reference feature value calculating section calculates reference feature values adjusted to the feature values of the extracted object, for the M types selected by the updated feature value selecting section, and selects the N types of reference feature values, from among the M calculated reference feature values, as part of the adjusted reference feature values.

The reference feature value calculating section may calculate, as part of the adjusted reference feature values, a reference feature value obtained by learning using an image of a region including the extracted object as a correct image.

The reference feature value calculating section may calculate, as an adjusted reference feature value, a reference feature value obtained by learning using an image of a region other than the extracted object as an incorrect image.

The image analyzing apparatus may further include: a matching degree calculating section that calculates a degree of matching of the feature values extracted by the feature value extracting section with respect to the reference feature values, for each type, where the object extracting section extracts an object from each of the moving image constituent images, based on the degree of matching calculated for each type.

The image analyzing apparatus may further include: the feature value recording section, the feature value extracting section, and the matching degree calculating section are implemented by a plurality of weak classifiers for recording the reference feature values different in type from each other, the plurality of weak classifiers extract the feature values different in type from each other, and each of the plurality of weak classifiers calculates and outputs a degree of matching of the extracted feature values with respect to the recorded reference feature values.

According to a second aspect of the innovations herein, provided is an image analyzing method for extracting a specific object from a moving image, including: recording a plurality of reference feature values different in type from each other; extracting a plurality of feature values different in type from each other, from each of a plurality of moving image constituent images included in a moving image; extracting an object from the moving image constituent images, based on a degree of matching of the extracted plurality of feature values with respect to the plurality of recorded reference feature values; calculating a plurality of reference feature values adjusted to the feature values of the extracted object, to a predetermined degree corresponding to the type, from the plurality of recorded reference feature values; and updating the plurality of recorded reference feature values, with the plurality of calculated reference feature values.

According to a third aspect of the innovations herein, provided is a computer readable medium storing therein a program for an image analyzing apparatus for extracting a specific object from a moving image, the program causing a computer to function as: a feature value recording section that records a plurality of reference feature values different in type from each other; a feature value extracting section that extracts a plurality of feature values different in type from each other, from each of a plurality of moving image constituent images included in a moving image; an object extracting section that extracts an object from the moving image constituent images, based on a degree of matching of the plurality of extracted feature values with respect to the plurality of reference feature values recorded in the feature value recording section; a reference feature value calculating section that calculates, from the plurality of reference feature values recorded in the feature value recording section, a plurality of reference feature values adjusted to the feature values of the extracted object, to a predetermined degree corresponding to the type; and a feature value updating section that updates the plurality of reference feature values recorded in the feature value recording section, with the plurality of reference feature values calculated by the reference feature value calculating section.

The summary of the invention does not necessarily describe all necessary features of the present invention. The present invention may also be a sub-combination of the features described above.

BRIEF DESCRIPTION OF THE DRAWINGS

FIG. 1 shows an example of an image processing system 10 according to an embodiment.

FIG. 4 schematically shows an exemplary processing content in a process 450.

DESCRIPTION OF EXEMPLARY EMBODIMENTS

Figure 2:
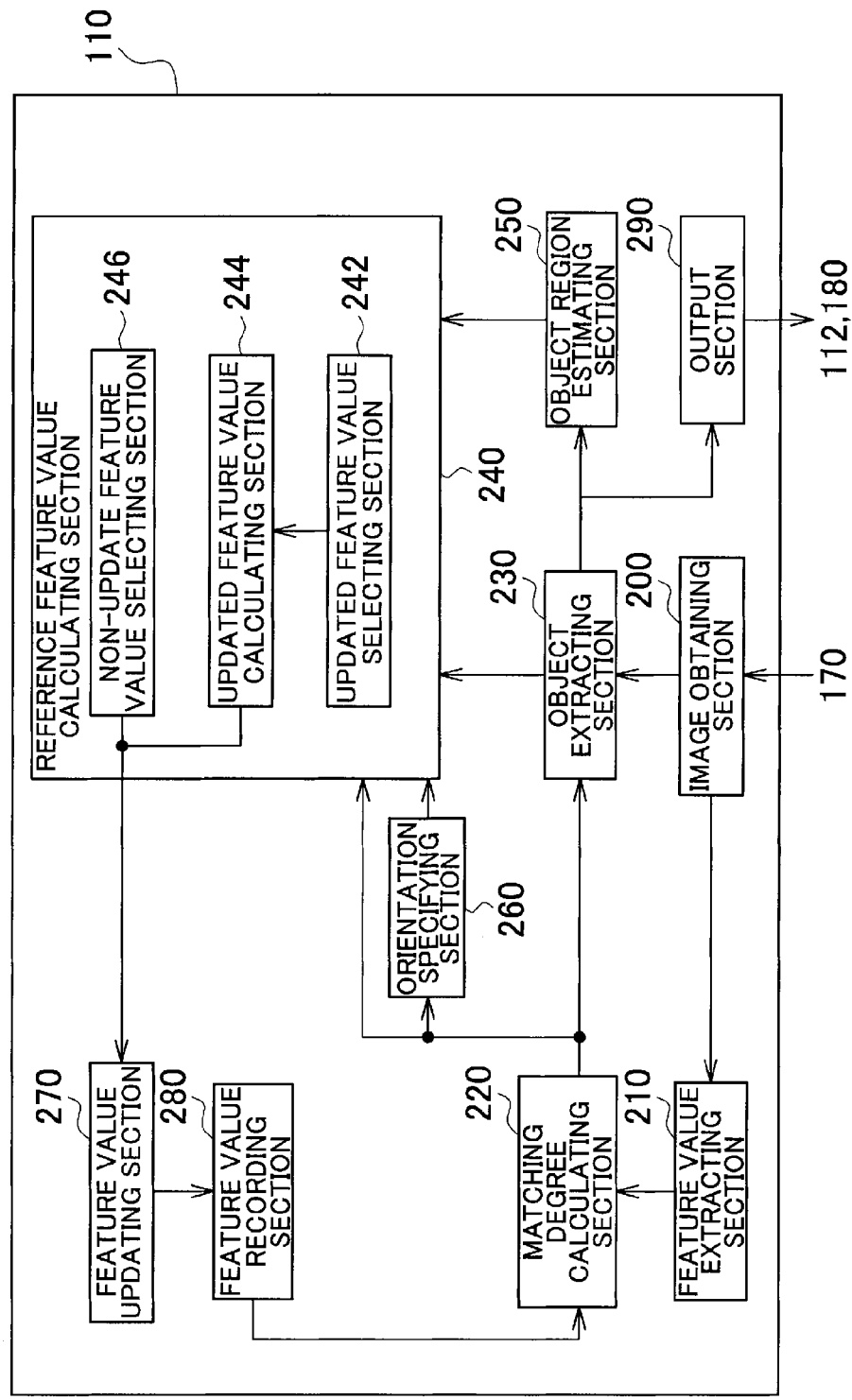
FIG. 2 shows an exemplary block configuration of an image analyzing apparatus 110.

The invention will now be described based on the preferred embodiments, which do not intend to limit the scope of the present invention, but exemplify the invention. All of the features and the combinations thereof described in the embodiment are not necessarily essential to the invention.

FIG. 1 shows an example of an image processing system 10 according to an embodiment. As described below, the image processing system 10 in an embodiment can function as an image processing system for a shop.

The image processing system 10 includes a plurality of image capturing apparatuses 100a-b for capturing an image of a shop interior 160, a shop server 170, a communication network 150, an image analyzing apparatus 110, an analysis result database 112, and a terminal apparatus 180. Note that in the following description, the image capturing apparatus 100a and the image capturing apparatus 100b are occasionally collectively referred to as "image capturing apparatus 100." This rule occasionally applies to the reference sign including an alphabet at the end.

The image capturing apparatus 100a captures an image of a shop interior 160. The image capturing apparatus 100a generates a moving image by capturing images of a person 164a and a person 164b in the shop interior 160 together with a store shelf 162a, a store shelf 162b, etc. in the shop interior 160. The image capturing apparatus 100a supplies a moving image obtained by capturing the image of the shop interior 160 to the shop server 170. Note that the image capturing apparatus 100b is installed in a position different from the image capturing apparatus 100a. Except for this point, the image capturing apparatus 100b has the same function and operation as the function and operation of the image capturing apparatus 100a, and so is not described in detail.

The shop server 170 sends the moving image supplied from the image capturing apparatus 100a and the image capturing apparatus 100b, onto the communication network 150 to be transmitted to the image analyzing apparatus 110. An electric communication circuit such as the Internet is an example of the communication network 150. The shop server 170 is provided near the image capturing apparatus 100, for example. In other embodiments, the shop server 170 may be provided in the shop interior 160.

The shop server 170 controls the image capturing operation of the image capturing apparatus 100. For example, the shop server 170 controls the on/off of the image capturing function, the image capturing rate, etc. of the image capturing apparatus 100. When the image capturing apparatus 100 has a zoom function, the shop server 170 may control a zoom value of the image capturing apparatus 100. When the image capturing direction of the image capturing apparatus 100 is variable, the shop server 170 may control the image capturing direction of the image capturing apparatus 100.

The image analyzing apparatus 110 is installed in a space different from the shop interior 160, and obtains respective moving images captured by the image capturing apparatus 100, from the shop server 170 via the communication network 150. The image analyzing apparatus 110 analyzes the moving image, and sends the analysis result to the communication network 150 to be transmitted to the terminal apparatus 180.

The image analyzing apparatus 110 may also output the analysis result to the analysis result database 112. The image analyzing apparatus 110 may read the analysis result from the analysis result database 112, and transmit the read analysis result to the terminal apparatus 180. Note that the analysis result database 112 may be included in the image analyzing apparatus 110. The analysis result database 112 may be installed in a space different from the space in which the image analyzing apparatus 110 is installed. In this case, the image analyzing apparatus 110 may transmit the analysis result to the analysis result database 112 via the communication network 150.

The terminal apparatus 180 obtains the analysis result of the image analyzing apparatus 110, from the image analyzing apparatus 110 via the communication network 150. The terminal apparatus 180 processes and displays the analysis result according to an instruction of a user. The terminal apparatus 180 may be installed in a space different from the space in which the image analyzing apparatus 110 is installed. The terminal apparatus 180 may be installed near the shop interior 160 or inside the shop interior 160.

The following explains an overview of an exemplary operation of the image analyzing apparatus 110. The image analyzing apparatus 110 detects an object corresponding to a moving body such as the person 164 from each of a plurality of frame images included in the moving image captured by the image capturing apparatus 100, and tracks an object of the same subject in the image. During this operation, the image analyzing apparatus 110 detects and tracks the object using a plurality of weak classifiers.

Specifically, the image analyzing apparatus 110 includes a plurality of weak classifiers for calculating an identification result from a low resolution image, a plurality of weak classifiers for calculating an identification result from an intermediate resolution image, and a plurality of weak classifiers for calculating an identification result from a high resolution image. These weak classifiers calculate an identification result based on the feature value extracted from an image.

A weak classifier for a low resolution image extracts an object of a specific type of subject such as a person, and calculates an identification result by extracting various types of feature values from a low resolution image. This enables detection of an object of a person highly robustly. Note a weak classifier for a low resolution image can be used without being adjusted to an object to be tracked. A weak classifier for a low resolution image is constituted to detect an object of a person highly robustly by prior learning etc.

A weak classifier for an intermediate resolution image also calculates an identification result by extracting various types of feature values. The weak classifiers for an intermediate resolution image are made up of a plurality of weak classifiers for extracting an object of a specific type of subject such as a person and a plurality of weak classifiers adjusted for an object to be tracked. A weak classifier for extracting an object of a specific type of subject is realized by prior learning etc., just as a weak classifier for a low resolution image, and is used without being adjusted to an object to be tracked. Among the weak classifiers for an intermediate resolution image, the weak classifiers adjusted for a person to be tracked learn frame by frame by online learning, for example.

A weak classifier for a high resolution image calculates an identification result by extracting various types of feature values. A weak classifier for a high resolution image is adjusted for an object to be tracked, frame by frame by online learning.

A weak classifier may be realized by prior learning, using a reinforcement leaning approach utilizing a teacher image. A group of weak classifiers may be created by group learning using boosting such as Adaboost. The online learning may be realized by utilizing an online boosting approach for example.

The image analyzing apparatus 110 extracts an object using a combination of weak classifiers different for each frame image, or extracts an object using a weak classifier obtained by adjusting a combination of weak classifiers different for each frame image. In this way, the image analyzing apparatus 110 extracts an object, by using a classifier resulting from combining weak classifiers for robustly detecting a specific type of object, with tracking operations operable to be adjusted to a subject. Therefore, the image analyzing apparatus 110 can robustly detect a specific type of object, and allow high definition tracking.

In the present embodiment, the term "extracting an object" means to detect and track a specific object from an image region. The image analyzing apparatus 110 may output, as an analysis result, position information such as coordinate information for identifying a region in which the extracted object is located. Alternatively, the image analyzing apparatus 110 may output an object image resulting from cutting out the region in which the object is located.

In this way, the image analyzing apparatus 110 globally searches the frame image for a new object using a class classifier. The image analyzing apparatus 110 uses observation information for both of frame images in the past and a current frame image of an object to be tracked, to perform each processes of object position prediction, object identification, and weak classifier update so as to track an object.

A class classifier can be used as a classifier for detecting a specific type of object. This type of class classifier can be considered as a classifier for identifying a species. On the other hand, a classifier for tracking an object should be operable to identify both of a species and each individual belonging to the species, depending on the environment of the object to be tracked.

For example, when there is no person around a person to be tracked, the classification ability of a tracking classifier can be comparatively low. For example, it is sufficient that the classifier can distinguish between a non-human object such as a background from a human object. In other words, the classification ability of the species degree will suffice. However, for accurate grasp of the flow line at the timing at which many people come and go or any timing before or after this timing, the classification ability required of the classifier becomes relatively high. Specifically, the ability of distinguishing among a plurality of people is required.

The image analyzing apparatus 110 explained above has a classifier flexibly adjusted to an object to be tracked, and so the classification ability of the classifier can be gradually and automatically adjusted to the environmental fluctuation such as background fluctuation and crowded degree fluctuation. In other words, the classifiers of the image analyzing apparatus 110 have a polymorphism characteristic. Therefore, the classifiers of the image analyzing apparatus 110 can be used as a species degree classifier and as a classifier for an individual object, depending on its situations.

In this way, the image analyzing apparatus 110 has a very large degree of flexibility, because of adjustment of its classifiers according to the environmental fluctuation. In addition, the classifiers of the image analyzing apparatus 110 are formed while tracking an object. Therefore, a classifier of a default state is not necessary in extracting an already detected object. In this way, the image analyzing apparatus 110 can deal with a wild environmental fluctuation, because detection and tracking processes are not independent therein.

A recording medium 90 records therein a program for the image analyzing apparatus 110. The program recorded in the image recording medium 90 is supplied to an electronic information processing apparatus such as a computer, which functions as the image analyzing apparatus 110 according to the present embodiment. A CPU of the computer operates according to the content of the program, to control each section of the computer. The program executed by the CPU causes the computer to function as the image analyzing apparatus 110 described with reference to the present drawing and the subsequent drawings.

Examples of the recording medium 90, other than CD-ROM, are an optical recording medium such as DVD or PD, a magnetooptical recording medium such as MO or MD, a magnetic recording medium such as a tape medium or a hard disk apparatus, a semiconductor memory, and a magnetic memory. The recording medium 90 may also be a recording apparatus such as a hard disk or a RAM provided in a server system connected through a dedicated communication network or the Internet.

The recording medium 90 may also record a program for the image processing system 10. A program for the image processing system 10 may cause a computer to function as, other than the image analyzing apparatus 110, at least one of the analysis result database 112, the shop server 170, the terminal apparatus 180, and the image capturing apparatus 100 described with reference to the present drawing and the subsequent drawings.

FIG. 2 shows an exemplary block configuration of an image analyzing apparatus 110. The image analyzing apparatus 110 includes an image obtaining section 200, a feature value extracting section 210, a matching degree calculating section 220, an object extracting section 230, a reference feature value calculating section 240, an object region estimating section 250, an orientation specifying section 260, a feature value updating section 270, a feature value recording section 280, and an output section 290. The reference feature value calculating section 240 includes an updated feature value selecting section 242, an updated feature value calculating section 244, and a non-update feature value selecting section 246.

The image obtaining section 200 obtains a moving image captured by the image capturing apparatus 100 from the shop server 170 via the communication network 150. The moving image obtained by the image obtaining section 200 is supplied to the feature value extracting section 210 and the object extracting section 230.

The feature value extracting section 210 extracts a feature value from a frame image included in the moving image. Examples of the feature value are a luminance feature value such as a luminance distribution, various Wavelet feature values, a Harr-like feature value, an Edgelet feature value, an EOH feature value, and a HOG feature value.

The matching degree calculating section 220 outputs the matching degree, with respect to a reference feature value, of the feature value extracted by the feature value extracting section 210. Concretely, the feature value recording section 280 records therein the reference feature value in advance, and the matching degree calculating section 220 outputs the matching degree with respect to the reference feature value recorded in the feature value recording section 280.

Note that the feature value extracting section 210 extracts each type of feature value. The feature value recording section 280 records therein a reference feature value for each type of feature value. The matching degree calculating section 220 calculates the matching degree for each type of feature value.

Here, example of different types of feature value are a Harr-like feature value and an Edgelet feature value, which are different from each other in type of feature value itself. Different types of feature value also include feature values calculated according to calculation methods different from each other. Different calculation methods include extraction from images having different resolutions from each other. That is, the different types of feature value in the present embodiment include feature values of a same type of feature value but extracted from images having different resolutions from each other.

The object extracting section 230 determines whether the target image is an image of a specific object, based on the matching degree for each type calculated by the matching degree calculating section 220. That is, the object extracting section 230 can extract an object.

The feature value extracting section 210, the matching degree calculating section 220, the feature value recording section 280, and the object extracting section 230 can be implemented as processing of a classifier. For example, regarding one type of feature value, a series of processing from extraction of a feature value by the feature value extracting section 210 to outputting of a matching degree by the matching degree calculating section 220 is considered as processing performed by a single weak classifier. If processing of the object extracting section 230 to determine whether it is an object image based on the degrees of matchings for a plurality of types of feature values is included in this series of processing, it constitutes processing performed by a single weak classifier for extracting an object.

When having determined that it is an object image, the object extracting section 230 cuts out, from a frame image, an object peripheral image which is an image of a predetermined region including the object, and supplies the object peripheral image to the reference feature value calculating section 240. The reference feature value calculating section 240 uses the image supplied from the object extracting section 230 to calculate a reference feature value for extracting the object from a next frame image. The reference feature value calculated by the reference feature value calculating section 240 is stored in the feature value recording section 280 by the feature value updating section 270. By doing so, the reference feature value stored in the feature value recording section 280 is updated with the reference feature value calculated by the reference feature value calculating section 240.

Then, an object is extracted from the next frame image according to the processing performed by the already described feature value extracting section 210, matching degree calculating section 220, and object extracting section 230. By performing this series of operations, an object is extracted from each of a plurality of frame images.

Note that the reference feature value calculating section 240 calculates a reference feature value adjusted to an object peripheral image by leaning using the object peripheral image. The reference feature value calculating section 240 calculates the feature value adjusted to the image of the object of the current frame. Therefore, the reference feature value calculating section 240 can calculate the reference feature value adjusted to track a specific object.

The reference feature value calculating section 240 calculates the reference feature value adjusted to an object peripheral image, and updating of one reference feature value indicates to adjust the above-described processing of the weak classifier. That is, feature value updating processing from calculation of a reference feature value by the reference feature value calculating section 240 to recording of the reference feature value in the feature value recording section 280 can be considered to be processing to realize the adjusted weak classifier. When the processing to calculate the reference feature value by the reference feature value calculating section 240 is performed based on learning, the feature value update processing can be considered to be the above-described online leaning processing of the classifier.

The reference feature value calculating section 240 can update the reference feature value according to the orientation of the subject captured as an extracted object. For example, the reference feature value calculating section 240 may record the reference feature value for extracting an object, for each orientation of the subject in the feature value recording section 280. In this case, the reference feature value calculating section 240 can select and update the reference feature value corresponding to the orientation of the subject captured as an extracted object.

The orientation specifying section 260 specifies the orientation of the subject captured as an object. When the feature value recording section 280 has recorded therein a reference feature value for each orientation, the orientation specifying section 260 can set the orientation recorded in the feature value recording section 280 in association with the reference feature value that matches the most, as the orientation of the subject. The reference feature value calculating section 240 can update the above-described reference feature value based on the orientation specified by the orientation specifying section 260.

The reference feature value calculating section 240 can calculate the reference feature value based on the degree of matching calculated by the matching degree calculating section 220. For example, the reference feature value having a higher degree of matching can be incorporated as the reference feature value for extracting the object from the next frame, by excluding reference feature values having lower degrees of matching. That is, a combination of weak classifiers can be changed. This improves the accuracy in tracking an object of a specific subject.

The reference feature value calculating section 240 can calculate the reference feature value based on the position of the object in each frame. For example, the reference feature value calculating section 240 can calculate the reference feature value by performing learning by using an image of the object in the current frame as an OK image (a correct image), or by performing learning by using an image in a region other than the region of the object in the current frame as an NG image (an incorrect image).

The object region estimating section 250 estimates the position of the object on the next frame image. Concretely, the object region estimating section 250 estimates the position of the object on the next frame image, based on the motion speed of the object in the moving image and the position of the object in the current frame image. The object region estimating section 250 can cut out, from the current frame image, the image of the region including the estimated position and supply the image to the reference feature value calculating section 240.

In this case, the reference feature value calculating section 240 can calculate the reference feature value by performing learning by using the image supplied from the object region estimating section 250 as an NG image. Accordingly, the reference feature value set stored in the feature value recording section 280 has been reinforced to make it difficult to detect an image in the neighborhood of the object in the next frame image, which increases the probability of detecting the object from the next frame image.

The following outlines the operation of each part of the reference feature value calculating section 240. The updated feature value selecting section 242 identifies the type of feature value to be updated. For example, the updated feature value selecting section 242 can introduce a new reference feature value by excluding a type of reference feature value having a low degree of matching as stated above. The updated feature value calculating section 244 adjusts the type of feature value selected by the updated feature value selecting section 242 by learning or the like. The non-update feature value selecting section 246 may select the type of feature value used for object extraction in the next frame image without adjusting it. The operation of each portion of the reference feature value calculating section 240 is detailed later.

The output section 290 outputs, to outside, information of the object extracted by the object extracting section 230. For example, the output section 290 may output the position of the extracted object, and the image of the extracted image itself to the analysis result database 112, the terminal apparatus 180, etc. As described above, the image analyzing apparatus 110 can integrally perform detection of an object and tracking of an object, reducing the operation amount for tracking an object.

Figure 3:
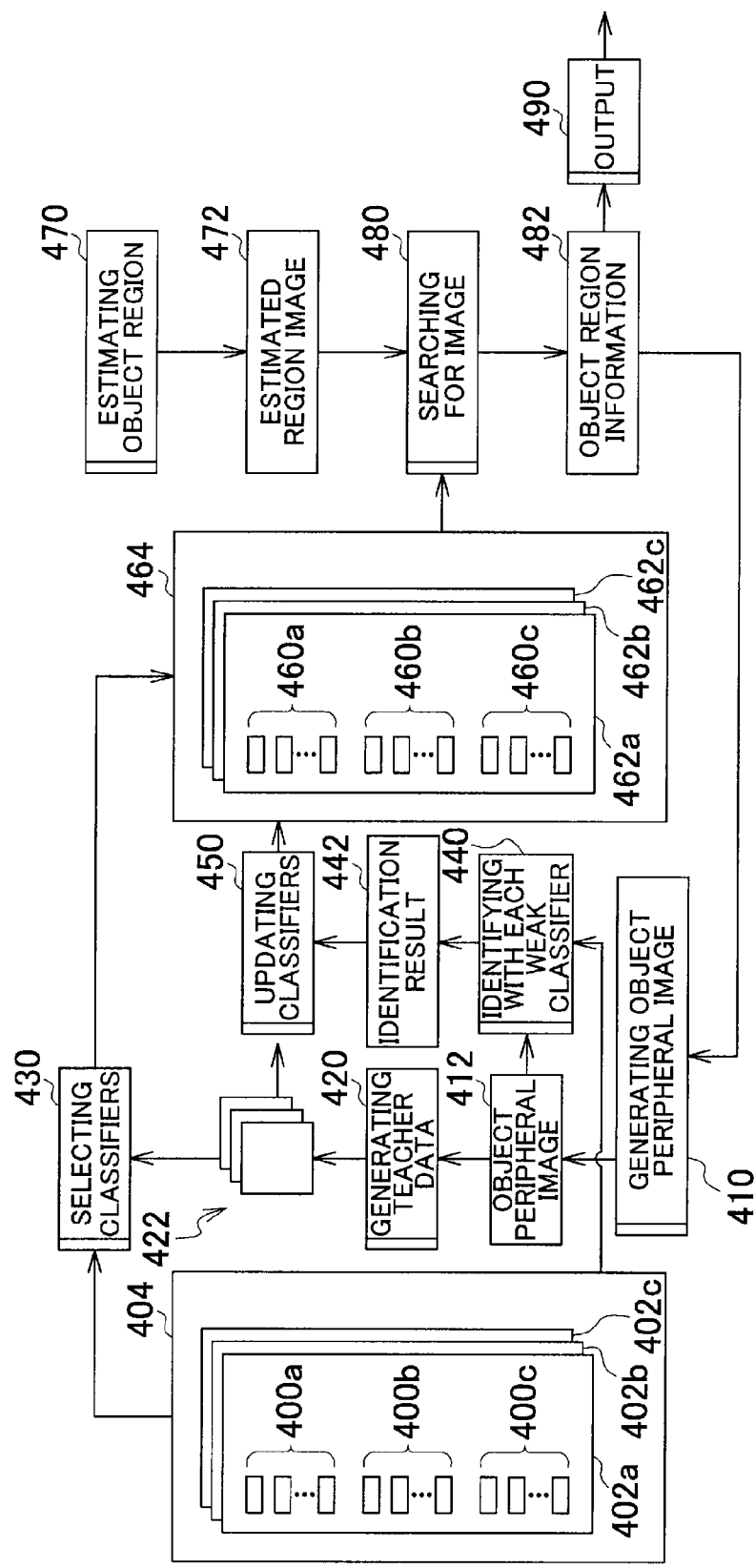
FIG. 3 schematically shows an exemplary processing content of the image analyzing apparatus 110.

FIG. 3 schematically shows an exemplary processing content of the image analyzing apparatus 110. The following describes the function and operation of the image analyzing apparatus 110, taking an example of processing of a classifier or a weak classifier.

A set of classifiers 404 include a plurality of classifiers 402*a-c* that can be used by the image analyzing apparatus 110 in extracting an object. The classifiers 402*a-c* respectively correspond to different orientations of a subject. Specifically, the classifier 402*a* is formed by a plurality of weak classifiers 400*a-c* adjusted to detect a front face of a person.

Here, the weak classifiers 400a are formed by one or more weak classifiers 400 for a low resolution image. For example, the weak classifiers 400a are formed by one or more weak classifiers 400 for an image of a resolution of 8*8 pixels. In the following drawings, one weak classifier 400 is shown by a horizontally long rectangle. The weak classifiers 400b are formed by one or more weak classifiers 400 for an intermediate resolution image. The weak classifiers 400c are formed by one or more weak classifiers 400 for a high resolution image. For example, the weak classifiers 400b are formed by one or more weak classifiers 400 for an image of a resolution of 16*16 pixels, and the weak classifiers 400c are formed by one or more weak classifiers 400 for an image of a resolution of 32*32 pixels. Weak classifiers having a comparatively low resolution such as the weak classifiers 400a can function as a classifier portion for detecting a species, while weak classifiers having a comparatively high resolution such as the weak classifiers 400c (or weak classifiers 400b) can function as a classifier portion for detecting an individual object. As detailed later, a weak classifier 400 having a comparatively high resolution can be adjusted to an individual object by online learning. In this way, having a hierarchical weak classifier configuration according to resolutions helps detect and track an individual object quickly.

The classifiers 402b are formed by a plurality of weak classifiers 400 adjusted to detect a right profile of a person. The classifiers 402c are formed by a plurality of weak classifiers 400 adjusted to detect a left profile of a person. For other features, the classifiers 402b and the classifiers 402c have substantially the same configuration as the classifiers 402a, and so are not detailed below.

The following explains the processing of the image analyzing apparatus 110 for generating, from the set of identifiers 404, a set of classifiers 464 used for object extraction. To simplify the explanation, the object extracting section 230 is assumed to have already extracted a specific object from the previous frame image in processing 480. The object extracting section 230 supplies information indicating the region of the object to the reference feature value calculating section 240.

By the time an object has been extracted, the matching degree calculating section 220 has calculated a degree of matching using the classifiers included in the set of classifiers 464. The degree of matching calculated by the matching degree calculating section 220 is supplied to the reference feature value calculating section 240. By the time an object has been extracted, the orientation specifying section 260 has specified the orientation of the subject indicated by the object, and so the specified orientation is also supplied to the reference feature value calculating section 240. By the time an object has been extracted, the object region estimating section 250 has estimated the region in which the object exists in the next frame image, and so the information on the estimated region has been supplied to the reference feature value calculating section 240.

The updated feature value calculating section 244 generates an object peripheral image 412 which is an image of a periphery of the object, based on the information on the region of the object (processing 410). Here, the object peripheral image is defined to be an image of a region including a region of the object and a region at the periphery of the object. The updated feature value calculating section 244 uses the object peripheral image 412 to generate a plurality of teacher images 422 having a predetermined number of pixels (processing 420).

The teacher images 422 include an OK image and an NG image. The updated feature value calculating section 244 generates a plurality of OK images, from the image of the region of the object in the object peripheral image 412. The updated feature value calculating section 244 also generates a plurality of NG images, from the image of a region including a region other than the object in the object peripheral image 412.

In the processing 430, the non-update feature value selecting section 246 selects classifiers used by the object extracting section 230 for extracting the object in the next frame image, from among the weak classifiers included in the classifiers 402. The classifiers selected in the processing 430 are used to extract the object, without being adjusted to the object peripheral image.

The following explanation is based on the assumption that the orientation specifying section 260 has extracted the object of the front face of a person. In this case, the weak classifiers 400 selected in the processing 430 and the weak classifiers 400 adjusted in the processing 450 are selected from the weak classifiers 400 forming the classifiers 402a. Needless to say, when the object of a right profile has been extracted, the weak classifiers 400 are selected from the classifiers 402b, and when the object of a left profile has been extracted, the weak classifiers 400 are selected from the classifiers 402c.

During this operation, weak classifiers 400 having a high degree of matching to the object may be selected. A predetermined number of weak classifiers 400 may be selected from among the weak classifiers 400a for a low resolution image. In addition to the weak classifiers 400a for a low resolution image, a predetermined number of weak classifiers 400 may be selected from among the weak classifiers 400a for an intermediate resolution image.

In this way, weak classifiers for detecting an individual object may be formed by copying all of the weak classifiers (e.g. all of the weak classifiers 400a) capable of functioning as a weak classifier for detecting a species, or part of them (e.g. part of the weak classifiers 400b). So-called complete inheritance and partial inheritance of weak classifiers for detecting a species will result in forming part of the weak classifiers for detection and tracking. Accordingly, an object detected by complete inheritance and partial inheritance of weak classifiers can be considered to belong to the species detected by the weak classifiers. These inherited weak classifiers may have been constituted in advance by offline learning.

On the other hand, the weak classifiers having a capability of detecting the feature of each individual (e.g., feature such as eyes and a mouth) can be generated by part of the weak classifiers 400b and the weak classifiers 400c. Concretely, part of the weak classifiers 400b and the weak classifiers 400c are evolved by online learning (e.g., AdaBoost approach) to reflect the feature of an individual. The evolved weak inherites 400c may incorporate the capability of identifying a plurality of individual tracked objects (e.g., individual objects belonging to a same species) respectively by online learning.

In this way, inheritance and evolution of weak inherites are performed according to a hierarchical structure according to resolutions. The processing of evolution of classifiers includes selection, exclusion, and update processing of weak classifiers. Especially in update processing, a new feature of an individual object is incorporated in a classifier by an online mechanical learning approach. Consequently, a weak classifier for detecting a species can be linked to a weak classifier for detecting an individual object, which helps detect and track an individual object quickly and with high accuracy.

The following explains the evolution processing using a functional block of the image analyzing apparatus 110. The weak classifiers 400 to be adjusted to the object peripheral image are selected by the processing of the updated feature value selecting section 242. Concretely, in the processing 440, the determining processing to the object peripheral image is performed by each of the weak classifiers 400 included in the set of classifiers 404, thereby calculating an identification result 442. In the processing 450, the set of classifiers 464 are generated based on the identification result 442.

For example, the weak classifiers 400 to be adjusted are selected by the processing performed by the updated feature value selecting section 242. The selected classifiers are used to extract an object, after being adjusted to the object peripheral image. During this operation, the weak classifiers 400 having a lower degree of matching to the object can be preferentially selected as a weak classifier to be adjusted. In addition, a predetermined number of weak classifiers 400 may be selected from among the weak classifiers 400b for an intermediate resolution image. In addition to the weak classifiers 400 selected from among the weak classifiers 400b, a predetermined number of weak classifiers 400 may be selected from among the weak classifiers 400c for a high resolution image.

Here, the weak classifiers 400 selected by the updated feature value selecting section 242 are adjusted to the object peripheral image 412, by the processing of the updated feature value calculating section 244. Here, the online boosting approach using the teacher image 422 may be used to adjust the weak classifiers 400. Then, the feature value updating section 270 generates the adjusted weak classifiers 460.

The set of classifiers 464 are constituted by the weak classifiers 460 adjusted in the processing 450 and the weak classifiers 400 selected in the processing 430. Note that although the weak classifiers 400 selected in the processing 430 have not been adjusted, they are shown as the weak classifiers 460 by changing the reference numeral, since they are used in extracting the object from the next frame image.

As described above, the weak classifiers 460a perform the same identification processing as performed by the weak classifiers 400a. The predetermined number of weak classifiers 460 from among the weak classifiers 460a are used to extract the object from the next frame image.

Each weak classifier of part of the weak classifiers 460 from among the weak classifiers 460b may perform the same identification processing as performed by a corresponding weak classifier 400 from among the weak classifiers 400b. Part of the weak classifiers 460 of them is used to extract the object from the next frame image. The remaining weak classifiers 460 of them may be the corresponding weak classifiers 400 from among the weak classifiers 400b after having been adjusted in the processing 450. The adjusted weak classifiers are used to extract the object from the next frame image.

The weak classifiers 460 selected as a weak classifier to be updated from the weak classifiers 460c are the corresponding weak classifiers 400 from among the weak classifiers 400c after having been adjusted in the processing 450, which are used to extract the object.

In the processing 480, the object extracting section 230 extracts the object from the next frame image, using weak classifiers 460 to be used to extract the object, from among the set of classifiers 464. Note that the processing 470 is performed by the object region estimating section 250 to estimate a region in which the object exists in the next frame image. In the processing 480, using the weak classifiers included in the set of classifiers 464, the object extracting section 230 performs processing to search for and recognize the object, onto the estimated region image 472 that is an image of the region estimated in the processing 470.

As described above, the image analyzing apparatus 110 inherits part of the parent weak classifiers in constituting the classifiers for detecting and tracking an individual object. Moreover, a capability of detecting the feature of the individual object is incorporated into the other part of the weak classifiers. By performing inheritance and evolution processing in this manner, an identification capability higher than in the case of online learning using the weak classifiers in the default state can be provided, while maintaining the capability of detecting a species.

As described above, the classifiers in the image analyzing apparatus 110 are formed hierarchically by the weak classifiers corresponding to the feature value from a rough image and the weak classifiers corresponding to the feature value from a finer image. In addition, the classifiers are formed to include the weak classifiers capable of fully expressing the attribute of the species corresponding to the feature value from a rough image. For this reason, the classifiers in the image analyzing apparatus 110 can function to detect a species. Furthermore, the image analyzing apparatus 110 can provide the classifiers with a capability of detecting a unique feature of an individual object, by evolving, in online learning, the weak classifiers for identifying an individual object to be tracked. As a result, the classifiers capable of detecting and identifying an individual object can be constituted to enable tracking of a plurality of objects in a movie scene.

The image analyzing apparatus 110 performs detection and tracking processing on an already detected object, using inherited and evolved weak classifiers, without using weak classifiers in a default state. Therefore, the tracking processing and the detection processing can be closely linked and not separated, which helps enhance efficient detection and tracking. As a result, the image analyzing apparatus 110 can enhance the capability of the classifiers to adjust to the environment.

FIG. 4 schematically shows an exemplary processing content related to the processing 450. The classifiers 502a are assumed to be used to detect a specific object. With reference to this drawing, the following explains the processing for constituting a new classifier used to extract an object from the next frame image. Here, specific focus is on the processing to constitute weak classifiers to be adjusted to an object peripheral image. Although the following only explains the processing onto the weak classifiers 462a for a front face, it is needless to say that similar processing is performed on the classifiers 462b and the classifiers 462c.

From among the classifiers 462a, the classifiers 502a are those actually used to extract an object. The classifiers 502 are divided into weak classifiers 500a and weak classifiers 500b. The weak classifiers 500a correspond to weak classifiers 460 used to extract an object from among the weak classifiers 460a and weak classifiers 460 used to extract an object from among the weak classifiers 460b but not being able to be adjusted to an object peripheral image. The weak classifiers 500b are weak classifiers that can be adjusted to an object peripheral image.

The weak classifiers 500a include part of the weak classifiers 460a for high resolution and part of the weak classifiers 460b for intermediate resolution. When a specific object has been extracted, the object extracting section 230 uses the weak classifiers 500a to extract the specific object from the subsequent one or more frame images. When the orientation of a face of captured person has changed by a great amount, the other classifiers 462 corresponding to the orientation of the face (e.g., classifiers 462b) are used. In this case, too, after extracting the object of the specific face orientation, the classifiers constituted for the specific face orientation from the subsequent one or more frame images can be used.

In this way, a combination of weak classifiers 500a for low resolution and part of intermediate resolution suited for extracting a specific object, which are selected from the weak classifiers 400a for detecting a person, are used to extract an object from the subsequent one or more frame images. This allows reduction in probability of mistakenly detecting a different object, as well as reducing the operation amount.

Next, the processing onto the weak classifiers 500b is explained. The weak classifiers 500b are formed by P weak classifiers 500. The P weak classifiers 500 provide the classifiers with a capability of identifying an individual object. In the processing 510, the updated feature value selecting section 242 allows to select N weak classifiers to be excluded. Concretely, the N weak classifiers are selected starting from a weak classifier having a low degree of matching with respect to the image of the object. As shown, the weak classifiers 500b are divided into (P−N) weak classifiers 520A and N weak classifiers 520B. By excluding the weak classifiers 520B in the processing 530, the (P−N) weak classifiers 520A remain.

In this way, the identification performance of weak classifiers corresponding to P feature values is evaluated using each individual object. Based on the evaluation result, the P weak classifiers are ranked according to the identification performance, to exclude the N weak classifiers having lower identification performance from them.

Next, the processing of generating weak classifiers 562 used to extract an object from the next frame image from the classifiers 402a is explained. In the processing 550, the updated feature value calculating section 244 selects M weak classifiers to be added, from among the weak classifiers 400 included in the classifiers 402a. In this case, the M weak classifiers 400 may be selected starting from a weak classifier having a higher degree of matching to the image of the object. The selected weak classifiers are shown as weak classifiers 552.

In this way, the individual object in the current frame image is used as evaluation data, to select weak classifiers corresponding to M feature values from among the weak classifiers 400 included in the classifiers 402a. It is also possible to select M feature values having a high evaluation value of identification performance from among the inherited weak classifiers 400a or weak classifiers 400b, thereby to select M weak classifiers corresponding to the selected M feature values from among the weak classifiers 400c. Here, it is also possible to perform evaluation on weak classifiers used to detect a different species of object, to select M weak classifiers at least containing the weak classifiers used to detect the different species of object.

In the processing 560, the selected weak classifiers 552 and the teacher images 422 are used to determine N weak classifiers 562 as weak classifiers used to extract an object from the next frame image, using an online boosting approach.

Concretely, each feature value is extracted from each of the teacher images 422, in the specific weak classifiers 552. By comparing the extracted feature value and the reference feature value, the determination value of determining whether each of the teacher images 422 is an OK image in the specific weak classifier 552 is determined for each of the teacher images 422. An error value between the teacher signal indicating whether the teacher image 422 is an OK image and the determination value is determined for each of the teacher images 422. The reference feature value calculating section 240 calculates a reference feature value minimizing a value resulting from weighting an error value determined for each of the teacher images 422. By setting the calculated reference feature value to be used in determining processing performed by the specific weak classifiers 552, the specific weak classifiers 552 can be adjusted to the teacher images.

Likewise, by calculating a reference feature value minimizing the weighted error value for each of the plurality of weak classifiers 552, each of the plurality of weak classifiers 552 can be adjusted to the teacher images 422. The updated feature value selecting section 242 preferentially selects N weak classifiers 552 having a smaller weighted error, as weak classifiers 562 to be used to extract an object from the next frame image. In this way, by performing online learning by using the object peripheral image of the object to be extracted as a teacher image, N effective weak classifiers 562 are selected from among the M weak classifiers 552.

The updated feature value calculating section 244 links the (P−N) weak classifiers 520A and the N weak classifiers 562, to form P weak classifiers. The formed weak classifiers and the weak classifiers 500a constitute classifiers actually used to extract an object from the next frame image. Accordingly, classifiers effective to detect and track an individual object are formed. The object extracting section 230 extracts an object from the next frame image, using the constituted classifiers.

Classifiers for extracting an object from a further next image are constituted by performing the processing explained with reference to the present drawing by considering the classifier constituted by the current frame image as the classifiers 502 in the present drawing. By repeating the similar processing, a specific object can be detected and tracked from a plurality of frame images included in a moving image.

Figure 5:
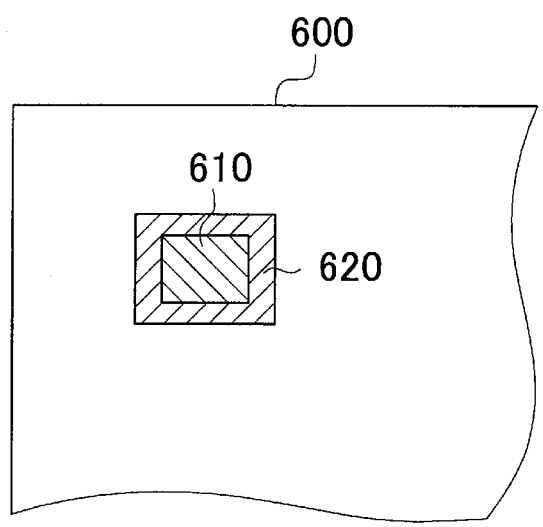
FIG. 5 shows an exemplary image region of an OK image and an NG image.

FIG. 5 shows an exemplary image region of an OK image and an NG image. The region 610 on the frame image 600 represents a region in which an object extracted from the frame image 600 exists. The region 620 represents a region on the periphery of the extracted object. The images of the region 610 and the region 620 correspond to the object peripheral image explained with reference to FIG. 3 and FIG. 4.

When generating a teacher image 422, the updated feature value calculating section 244 generates a plurality of OK images from the image corresponding to the region 610. The updated feature value calculating section 244 generates a plurality of NG images from the image corresponding to the region 620. The classifiers can be adjusted to an object peripheral image, by learning using the plurality of OK images and the plurality of NG images.

Figure 6:
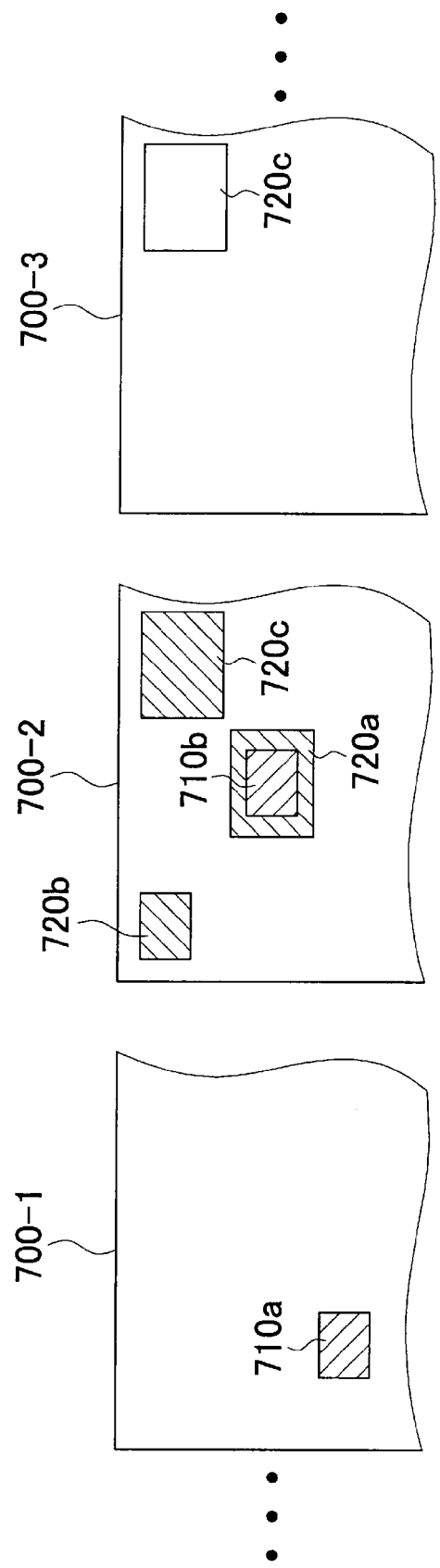
FIG. 6 shows another example of an image region of an OK image and an NG image.

FIG. 6 shows another example of an image region of an OK image and an NG image. The frame image 700-1, the frame image 700-2, and the frame image 700-3 are assumed to be a series of frame images captured in this order. The updated feature value calculating section 244 generates a teacher image 422 for extracting an object from the frame image 700-3, onto the frame image 700-1 and the frame image 700-2.

The region 710b on the frame image 700-2 corresponds to the region 610 explained in FIG. 5, and a plurality of OK images are generated from the region 710b. The region 710b may include a peripheral region of the extracted object (e.g., a region wider than the region of the extracted object by 2 to 3 pixels). By setting the image including the peripheral region as an image region of an OK image, it becomes possible to deal with fluctuation of the tracked object.

The region 720a on the frame image 700-2 corresponds to the region 620 explained with reference to FIG. 5, and a plurality of NG images are generated from the region 720a. The region 720a becomes an image region to be a background at the periphery of the object. The image region of the NG image can be set to be a region from which the tracked object is detected in the frame image 700-2.

The region 710*a* on the frame image 700-1 is a region of the object extracted from the frame image 700-1, and a plurality of OK images are generated from the region 710*a* in the processing performed by the updated feature value calculating section 244. Here, the object extracted from the region 710*a* on the frame image 700-1 and the object extracted from the region 710*b* on the frame image 700-2 are assumed to correspond to the object of the same subject.

The region 720*b* on the frame image 700-2 is a region from which another object is extracted in the frame image 700-2, and a plurality of NG images are generated from the region 720*b* in the processing performed by the updated feature value calculating section 244. An NG image can be generated from the region 720*b* of another object near the tracked object. In this way, by generating an NG image from the region corresponding to another object, the probability of detecting another object as a specific object can be reduced.

The region 720*c* represents a region in which the object existing in the region 720*a* is predicted to exist in the next frame image 700-3. The region 720*c* is estimated by the object region estimating section 250 based on the movement of the object. The updated feature value calculating section 244 generates a plurality of NG images from the region 720*c* on the frame image 700-2.

It is likely that the region 720*c* on the frame image 700-2 contains the subject existing around the specific object in the frame image 700-3. Therefore, by setting the region 720*c* on the frame image 700-2 as an NG image, the probability of detecting, from the frame image 700-3, the object of another subject existing near the object to be tracked as the object to be tracked can be reduced.

The object extracting section 230 can extract an object from the region 720*c* on the frame image 700-3. The region from which the object extracting section 230 extracts an object and the region corresponding to where an NG image is generated can be the same region on an image region. Note that the region in which an NG image is generated can be smaller than the region from which an object is extracted.

As explained in FIG. 5 and FIG. 6, not only the object image in the current frame, the image of the object in the previous frame is also used as an OK image. In addition, not only the background image of the peripheral image of the object, the background image near the object at the timing of the next frame as well as the image of another object near the tracked object can also be used as NG images. In addition, not limited to learning for each frame, the image analyzing apparatus 110 can incorporate the movement of the object and the change in object pattern in the online learning. This helps enhance the capability of the classifiers to deal with the environmental fluctuations.

The online learning for generating the weak classifiers for identifying an individual object may not be performed on each frame. The tracking in the moving image is required of real time performance in high speed. The frequency of online learning can be adjusted to retain the real time performance.

For example, when the object is in a still state, or when the movement amount (change amount) of the object is smaller than a predetermined value, online learning may not be performed. When the surrounding environment has not been substantially changed, or when the object has not been substantially changed, the object can be detected and tracked without online learning.

Online learning is also unnecessary when the similarity degree of the object obtained by identification performed by the weak classifiers for identifying an individual object is higher than a predetermined first value. When a sufficiently high similarity degree is determined by the current classifiers, it means that the feature of the individual object has already been incorporated in the weak classifiers, and therefore the individual object can be detected and tracked to a sufficient degree, even without online learning. Except for this, when the similarity degree is lower than a predetermined second value (smaller than the first value), the online learning is unnecessary. A very small similarity degree means a high possibility of occlusion of an object or false positive. If online learning is performed in such a case, the object ceased to be occluded is not likely to be detected or tracked. Therefore, when the similarity degree is very low, it should be preferable not to perform learning from a viewpoint of stability of an instance classifier.

As described above, the image analyzing apparatus 110 can constitute classifiers capable to collectively performing detection of an object and recognition of an object. The operation amount required for the processing can be notably decreased.

In FIG. 4 through FIG. 6, the function and operation of the image analyzing apparatus 110 are explained taking an example of the processing performed by the classifiers or the weak classifiers. As described above, the function and operation of the feature value extracting section 210, the matching degree calculating section 220, the feature value recording section 280, and the object extracting section 230 can be considered to be the function and operation of the weak classifiers. The adjustment and update of a reference feature value can be considered to be selection and adjustment of classifiers. Therefore, if each constituting element of the image analyzing apparatus 110 operates with respect to a reference feature value as follows, the function identical to the function concretely explained with reference to the classifiers in FIG. 4 through FIG. 6 can be realized.

According to the operation explained below, the image analyzing apparatus 110 can extract a specific object from a moving image. Extraction of an object includes tracking by identifying the position of each object. The feature value recording section 280 records therein a plurality of reference feature values having types different from each other. The feature value extracting section 210 extracts a plurality of feature values having types different from each other, from each of a plurality of frame images included in a moving image. The object extracting section 230 extracts an object from a frame image, based on degrees of matching of a plurality of feature values extracted corresponding to the plurality of reference feature values recorded in the feature value recording section 280.

The reference feature value calculating section 240 calculates, from the reference feature values recorded in the feature value recording section 280, a plurality of reference feature values adjusted to the feature values of the extracted object, at a predetermined degree according to the feature value type. The feature value updating section 270 updates the plurality of reference feature values recorded in the feature value recording section 280, with the reference feature values calculated by the reference feature value calculating section 240.

The reference feature value calculating section 240 may calculate the plurality of reference feature values adjusted to the feature values of the extracted object, such that a reference feature value of a type having a greater degree of matching is adjusted at a greater degree. The reference feature value calculating section 240 may calculate a plurality of reference feature values adjusted to the feature values of the extracted object, with frequencies according to types of the plurality of reference feature values.

The feature value recording section 280 records therein a plurality of reference feature values corresponding to the plurality of feature values extracted from images having different resolutions from each other. The feature value extracting section 210 extracts a plurality of feature values from the images having different resolutions from each other. The reference feature value calculating section 240 calculates a plurality of reference feature values adjusted to the feature values of the extracted object at intensities according to the resolutions. The reference feature value calculating section 240 may calculate the plurality of reference feature values, such that a reference feature value having a larger resolution is adjusted at a greater degree. Note that the reference feature value calculating section 240 may calculate a plurality of reference feature values adjusted to the feature values of the extracted object, which have larger resolutions than a predetermined value.

With reference to the operation of the reference feature value calculating section 240, the updated feature value selecting section 242 preferentially selects a type of reference feature value having a greater degree of matching to the feature value of the extracted object, from among the types other than the type of the reference feature value selected by the non-update feature value selecting section 246. The updated feature value calculating section 244 calculates one or more reference feature values adjusted to the feature values of the extracted object, for the type selected by the updated feature value selecting section 242. The updated feature value calculating section 244 preferentially selects a reference feature value having a greater degree of matching with respect to the feature value of the extracted object, from among the plurality of adjusted reference feature values, as an adjusted reference feature value. An example of the degree of matching is a learning error in the learning processing.

The object extracting section 230 may extract an object using at least P predetermined types of reference feature values that can be updated. The updated feature value calculating section 244 may preferentially select N types of reference feature values having a greater degree of matching, as the adjusted reference feature values. The non-update feature value selecting section 246 sets, as the adjusted reference feature value, (P–N) types of reference feature values having a degree of matching equal to or larger than a predetermined value, which have been used by the object extracting section 230 to extract an object from a frame image. In this case, the N types of feature values selected in the order of the degrees of matching may be set as a reference feature value.

The updated feature value selecting section 242 selects M types of feature values (M is larger than N) having a greater degree of matching. The M types of feature values may be selected, starting from those having a greater degree of matching. For the M types selected by the updated feature value selecting section 242, the reference feature value calculating section 240 calculates reference feature values adjusted to the feature values of the extracted object. The reference feature value calculating section 240 may preferentially select the N types of reference feature values having a greater degree of matching, from among the M calculated reference feature values, as the adjusted reference feature values.

When selecting an non-updated feature value, the non-update feature value selecting section 246 may set one or more types of reference feature values matching a predetermined condition, which have been used by the object extracting section 230 to extract an object, as the adjusted reference feature values. In other words, one or more types of reference feature values matching a predetermined condition are not updated, to be used by the object extracting section 230 to extract an object from the next frame image.

When selecting an non-updated feature value, the non-update feature value selecting section 246 can use, as the adjusted reference feature value, one or more types of reference feature values having a degree of matching equal to or greater than a predetermined value, which have been used by the object extracting section 230 to extract an object from a frame image. The non-update feature value selecting section 246 may select the adjusted reference feature value based on a teacher image 422. Concretely, the non-update feature value selecting section 246 may select a combination of reference feature values whose probability of having an affirmative result for an OK image is larger than a predetermined value, by learning based on the teacher image 422. In addition, the non-update feature value selecting section 246 may select a combination of reference feature values whose probability of having a negative result for an NG image is larger than a predetermined value, by learning based on the teacher image 422.

In the processing to adjust the feature values, the reference feature value calculating section 240 may calculate, as the adjusted reference feature value, the reference feature value obtained by learning using the image of the region including the extracted object as the OK image. In addition, the reference feature value calculating section 240 may calculate, as the adjusted reference feature value, the reference feature value obtained by learning using the image of the region other than the extracted object as the NG image.

The reference feature value calculating section 240 may calculate the reference feature value by setting, as an OK image, the image of the region including the specific object extracted from the frame image. The reference feature value calculating section 240 calculates the reference feature value by setting, as an OK image, an image of a region including a specific object extracted from the previous frame image of the frame image. Here, the object extracting section 230 may extract a specific object from the next frame image based on the degree of matching of the feature value extracted by the feature value extracting section 210 from the next frame image, with respect to the reference feature value.

The reference feature value calculating section 240 may calculate the reference feature value, by setting the image of the region not including the specific object extracted from the frame image, as an NG image. The reference feature value calculating section 240 may calculate the reference feature value, by setting the image of the region at a predetermined distance from the specific object extracted from the frame image, as an NG image. In addition, the reference feature value calculating section 240 may calculate the reference feature value, by setting the image of the region including another object extracted from the frame image, as an NG image.

The object region estimating section 250 estimates a region to contain the specific object in another frame image based on the moving amount of the specific object extracted from the moving image. The reference feature value calculating section 240 may calculate the reference feature value by setting, as an NG image, the image including the region estimated by the object region estimating section 250 in another frame image.

Note that the matching degree calculating section 220 calculates the degree of matching of the feature value extracted by the feature value extracting section 210 with respect to a reference feature value, for each feature value type. In this case, the object extracting section 230 extracts an object from each of the plurality of frame images based on the degree of matching calculated for each feature value type. In this case, the object extracting section 230 may extract a specific object, when the number of feature values whose degree of matching is larger than a predetermined degree of matching is larger than a predetermined value. Alternatively, the object extracting section 230 may extract a specific object, when the total of the degrees of matching assigned a predetermined weight is larger than a predetermined value.

Note that the feature value recording section 280 records therein a plurality of reference feature values in association with orientations of a subject. The feature value extracting section 210 extracts a plurality of feature values, from each of a plurality of frame images included in a moving image. The object extracting section 230 extracts an object of a specific subject from a frame image, based on degrees of matching of a plurality of extracted feature values with respect to the plurality of reference feature values recorded in association with the orientation of a subject in the feature value recording section 280.

The orientation specifying section 260 specifies the orientation of a specific subject. During this operation, the orientation may be specified based on the degree of matching with respect to the reference feature value. For example, the orientation specifying section 260 may specify, as the orientation of the specific subject, the orientation of the subject recorded in the feature value recording section 280 in association with the reference feature value whose degree of matching is calculated to be larger than a predetermined value, from among the plurality of feature values recorded in the feature value recording section 280.

In this way, the orientation specifying section 260 may calculate the degree of matching for each orientation of the subject, by comparing the feature values extracted by the feature value extracting section 210 from an image having a resolution smaller than a predetermined resolution, with the reference feature values of the same resolution respectively. The orientation specifying section 260 may specify, as the orientation of the specific object, the orientation of the subject associated with the reference feature value whose degree of matching is calculated to be larger.

The reference feature value calculating section 240 calculates the reference feature value adjusted to the extracted object, from the reference feature values recorded in the feature value recording section 280. The feature value updating section 270 may update the reference feature value recorded in the feature value recording section 280 in association with the specified orientation, with the reference feature value calculated by the reference feature value calculating section 240. Accordingly, the combination of reference feature values suited to the orientation of the subject can be reinforced by learning processes.

As described above, the image analyzing apparatus 110 can utilize the close link between the tracking processing and the detection processing to introduce the concept of inheritance and evolution into the class classifiers, thereby constituting class classifiers for tracking an object from class classifiers for detecting a species. By online learning for evolution, the capability of dealing with the environmental fluctuation can be dynamically incorporated into the classifiers. As a result, the classifiers realized by the image analyzing apparatus 110 can realize such functions as distinguishing between persons and dealing with the environmental fluctuations.

For example, the image analyzing apparatus 110 can adequately pursue detection and tracking, against the fluctuation in the form of the object due to the fluctuation in posture of the subject or the like, the fluctuation in the environment in which the subject exists including the illumination fluctuation and the background fluctuation, and the fluctuation in image capturing performance (e.g., contrast fluctuation and fluctuation in resolution performance such as blurring). It is also possible to adequately pursue detection and tracking in the environment susceptible to occlusion such as overlapping of objects or blocking by circumferential objects. Moreover it is also possible to adequately pursue detection and tracking even when the image capturing apparatus 100 itself moves. Moreover each object can be adequately distinguished from each other when tracking a plurality of objects. Since an individual object can be easily detected, the cooperation and collaboration between a plurality of image capturing apparatuses 100 can be made easier. Furthermore, it is also possible to adequately pursue detection and tracking even when the regularity of movement of an object is comparatively low, or when information for estimating the movement of an object is lacking. It is also possible to adequately pursue detection and tracking even when there is image noise. In this way, the image analyzing apparatus 110 can extract an individual object stably and with high accuracy against the described environmental fluctuations.

As described above with reference to FIG. 1 though FIG. 6, the image processing system 10 can accurately track a specific client, and so helps accurately analyze client information, or accurately analyze the commodities that the client showed interest. In this way, the image processing system 10 can function as an image processing system for shops.

The image processing system 10 can also be used for various other purposes. For example, the image processing system 10 can provide clients with advertisement content based on the information of the commodities that the client showed interest, in which case the image processing system 10 functions as a signage system. The image processing system 10 can also function as a monitoring system or a security system that can identify an object that a suspicious person has focused on. In addition, the image processing system 10 can function as an authentication system for authenticating a specific subject.

In addition, the image analyzing apparatus 110 can obtain moving images of different shop interiors 160 and analyze them. Accordingly, the client trend can be compared between shops. Although the operation and function of the image processing system 10 has been described above in the context for shops, the image processing system 10 can also be used for various other purposes.

Although some aspects of the present invention have been described by way of exemplary embodiments, it should be understood that those skilled in the art might make many changes and substitutions without departing from the spirit and the scope of the present invention which is defined only by the appended claims.

The operations, the processes, the steps, or the like in the apparatus, the system, the program, and the method described in the claims, the specification, and the drawings are not necessarily performed in the described order. The operations, the processes, the steps, or the like can be performed in an arbitrary order, unless the output of the former-described processing is used in the later processing. Even when expressions such as "First," or "Next," or the like are used to explain the operational flow in the claims, the specification, or the drawings, they are intended to facilitate the understanding of the invention, and are never intended to show that the described order is mandatory.

What is claimed is:

1. An image analyzing apparatus for extracting a specific object from a moving image, comprising:

a feature value recording section that records a plurality of reference feature values different in type from each other;

a feature value extracting section that extracts a plurality of feature values different in type from each other, from each of a plurality of moving image constituent images included in a moving image;

an object extracting section that extracts an object from the moving image constituent images, based on a degree of matching of the plurality of extracted feature values with respect to the plurality of reference feature values recorded in the feature value recording section;

a reference feature value calculating section that calculates, from the plurality of reference feature values recorded in the feature value recording section, a plurality of reference feature values adjusted to the feature values of the extracted object, to a predetermined degree corresponding to the type; and a feature value updating section that updates the plurality of reference feature values recorded in the feature value recording section, with the plurality of reference feature values calculated by the reference feature value calculating section, wherein the feature value extracting section extracts a plurality of feature values from images having different resolutions from each other;

the feature value recording section records therein a plurality of reference feature values corresponding to the plurality of feature values extracted from the images having different resolutions from each other; and the reference feature value calculating section calculates a plurality of reference feature values adjusted to the feature values of the extracted object to a degree corresponding to the resolution.

2. The image analyzing apparatus according to claim 1, wherein the reference feature value calculating section calculates the plurality of reference feature values adjusted to the feature values of the extracted object, such that a reference feature value of a type having a greater degree of matching is adjusted to a greater degree.

3. The image analyzing apparatus according to claim 1, wherein the reference feature value calculating section calculates a plurality of reference feature values adjusted to the feature values of the extracted object, with frequencies corresponding to the type.

4. The image analyzing apparatus according to claim 1, wherein the reference feature value calculating section calculates the plurality of reference feature values, such that a reference feature value having a larger resolution is adjusted to a greater degree.

5. The image analyzing apparatus according to claim 4, wherein the reference feature value calculating section calculates the plurality of reference feature values that are adjusted to the feature values of the extracted object and correspond to a resolution larger than a predetermined value.

6. The image analyzing apparatus according to claim 1, wherein the reference feature value calculating section includes a non-update feature value selecting section that sets one or more types of reference feature values matching a predetermined condition, which have been used by the object extracting section to extract an object from the moving image constituent images, as part of the adjusted reference feature values.

7. The image analyzing apparatus according to claim 6, wherein the non-update feature value selecting section sets, as part of the adjusted reference feature values, one or more types of reference feature values having a degree of matching equal to or greater than a predetermined value, which have been used by the object extracting section to extract an object from the moving image constituent images.

8. The image analyzing apparatus according to claim 6, wherein the reference feature value calculating section further includes:

an updated feature value selecting section that preferentially selects a type having a greater degree of matching, from among types other than the types of reference feature values selected by the non-update feature value selecting section; and an updated feature value calculating section that calculates one or more reference feature values adjusted to the feature values of the extracted object, for the type selected by the updated feature value selecting section.

9. The image analyzing apparatus according to claim 8, wherein the updated feature value calculating section selects one or more of the adjusted reference feature values, as part of the adjusted reference feature values, by giving higher priority to a reference feature value having a higher degree of matching with respect to a feature value of the extracted object.

10. The image analyzing apparatus according to claim 9, wherein the object extracting section extracts an object using at least P predetermined types of reference feature values that can be updated, the updated feature value calculating section selects N types of reference feature values as part of the adjusted reference feature values, by giving higher priority to a reference feature value having a higher degree of matching with respect to a feature value of the extracted object, and the non-update feature value selecting section sets, as part of the adjusted reference feature values, (P-N) types of reference feature values having a degree of matching equal to or larger than a predetermined value, which have been used by the object extracting section to extract an object from the moving image constituent images.

11. The image analyzing apparatus according to claim 10, wherein the updated feature value selecting section selects M types of reference feature values by giving higher priority to a reference feature value having a higher degree of matching with respect to a feature value of the extracted object, M being larger than N, and the reference feature value calculating section calculates reference feature values adjusted to the feature values of the extracted object, for the M types selected by the updated feature value selecting section, and selects the N types of reference feature values, from among the M calculated reference feature values, as part of the adjusted reference feature values.

12. The image analyzing apparatus according to claim 1, wherein the reference feature value calculating section calculates, as part of the adjusted reference feature values, a reference feature value obtained by learning using an image of a region including the extracted object as a correct image.

13. The image analyzing apparatus according to claim 1, wherein
the reference feature value calculating section calculates, as an adjusted reference feature value, a reference feature value obtained by learning using an image of a region other than the extracted object as an incorrect image.

14. The image analyzing apparatus according to claim 1, further comprising:
a matching degree calculating section that calculates a degree of matching of the feature values extracted by the feature value extracting section with respect to the reference feature values, for each type, wherein
the object extracting section extracts an object from each of the moving image constituent images, based on the degree of matching calculated for each type.

15. The image analyzing apparatus according to claim 14, wherein
the feature value recording section, the feature value extracting section, and the matching degree calculating section are implemented by a plurality of weak classifiers for recording the reference feature values different in type from each other,
the plurality of weak classifiers extract the feature values different in type from each other, and
each of the plurality of weak classifiers calculates and outputs a degree of matching of the extracted feature values with respect to the recorded reference feature values.

16. An image analyzing method for extracting a specific object from a moving image, comprising:
recording a plurality of reference feature values different in type from each other;
extracting a plurality of feature values different in type from each other, from each of a plurality of moving image constituent images included in a moving image;
extracting an object from the moving image constituent images, based on a degree of matching of the extracted plurality of feature values with respect to the plurality of recorded reference feature values;
calculating a plurality of reference feature values adjusted to the feature values of the extracted object, to a predetermined degree corresponding to the type, from the plurality of recorded reference feature values; and
updating the plurality of recorded reference feature values, with the plurality of calculated reference feature values, the method further comprising:
extracting a plurality of feature values from images having different resolutions from each other;
recording a plurality of reference feature values corresponding to the plurality of feature values extracted from the images having different resolutions from each other; and
calculating a plurality of reference feature values adjusted to the feature values of the extracted object to a degree corresponding to the resolution.

17. A non-transitory computer readable medium storing therein a program for an image analyzing apparatus for extracting a specific object from a moving image, the program causing a computer to function as:
a feature value recording section that records a plurality of reference feature values different in type from each other;
a feature value extracting section that extracts a plurality of feature values different in type from each other, from each of a plurality of moving image constituent images included in a moving image;
an object extracting section that extracts an object from the moving image constituent images, based on a degree of matching of the plurality of extracted feature values with respect to the plurality of reference feature values recorded in the feature value recording section;
a reference feature value calculating section that calculates, from the plurality of reference feature values recorded in the feature value recording section, a plurality of reference feature values adjusted to the feature values of the extracted object, to a predetermined degree corresponding to the type; and
a feature value updating section that updates the plurality of reference feature values recorded in the feature value recording section, with the plurality of reference feature values calculated by the reference feature value calculating section, wherein
the feature value extracting section extracts a plurality of feature values from images having different resolutions from each other;
the feature value recording section records therein a plurality of reference feature values corresponding to the plurality of feature values extracted from the images having different resolutions from each other; and
the reference feature value calculating section calculates a plurality of reference feature values adjusted to the feature values of the extracted object to a degree corresponding to the resolution.

* * * * *